United States Patent [19]

Queveau

[11] Patent Number: 4,498,701
[45] Date of Patent: Feb. 12, 1985

[54] RETRACTABLE CLOSURE PARTICULARLY SLIDING ROOF APPARATUS FOR A MOTOR VEHICLE

[76] Inventor: Gerard Queveau, Amik-Farm, Le Pin, 79140 Cerizay, France

[21] Appl. No.: 471,160

[22] Filed: Mar. 1, 1983

[30] Foreign Application Priority Data

Mar. 1, 1982 [FR] France .............................. 82 03346
May 19, 1982 [FR] France .............................. 82 08877

[51] Int. Cl.$^3$ ............................................. B60J 7/18
[52] U.S. Cl. ...................................... 296/216; 49/372
[58] Field of Search ............... 296/216, 222, 223, 224; 49/372

[56] References Cited

U.S. PATENT DOCUMENTS

| | | | |
|---|---|---|---|
| 2,193,607 | 3/1940 | Votypka | 296/222 |
| 2,193,608 | 3/1940 | Votypka | 296/222 |
| 3,075,807 | 1/1963 | Werner | 296/216 |
| 4,231,608 | 11/1980 | Sorensen | 296/216 |
| 4,346,932 | 8/1983 | Iwata et al. | 296/216 |

FOREIGN PATENT DOCUMENTS

| | | |
|---|---|---|
| 0035371 | 9/1981 | European Pat. Off. . |
| 713106 | 10/1941 | Fed. Rep. of Germany . |
| 1281871 | 10/1968 | Fed. Rep. of Germany . |
| 2920665 | 12/1980 | Fed. Rep. of Germany . |
| 2019977 | 6/1970 | France . |
| 2435365 | 9/1979 | France . |

Primary Examiner—Robert R. Song
Attorney, Agent, or Firm—Leydig, Voit, Osann, Mayer & Holt, Ltd.

[57] ABSTRACT

A retractable closure for an aperture, particularly suited as a sliding roof apparatus for motor vehicles, is disclosed. A retractable panel is mounted for generally horizontal translation without jogs between a first, closed position substantially flush with the upper surface of the structure and covering said aperture and a second, open position over a stationary panel in a recessed area adjacent said aperture. A liftable panel is provided above the stationary panel and moves between a first, lowered position 10 substantially flush with the upper surface of the structure and covering the recessed area and a second, raised position in which it creates a vertical space between its lower surface and the stationary panel into which vertical space the retractable panel translates in moving into its second, open position. Actuators for the retractable and liftable panels may be either separate or combined. In a preferred embodiment, while separate actuating mechanisms are provided for the retractable and liftable panels, the former acts on the latter during the initial opening phases to initiate the lifting.

12 Claims, 16 Drawing Figures

RETRACTABLE CLOSURE PARTICULARLY SLIDING ROOF APPARATUS FOR A MOTOR VEHICLE

BACKGROUND OF THE INVENTION

The present invention relates to a retractable closure for an opening in a generally planar, relatively thin structure, in particular a sliding roof apparatus for motor vehicles such as lorry cabs, private cars and the like.

There are already known a number of retractable roof panels for motor vehicles. The main drawback of known roof panels is the fact that the operating members, associated mechanisms and sealing members are often bulky and may project inside the passenger compartment where they can be obtrusive, especially when located near the driver and/or the passengers, particularly above their heads, where they may pose safety hazards.

Moreover, in these known devices, which are usually in the shape of sliding inner panels opened from inside the passenger compartment by means of an operating member, such as a handle, the panels often retract underneath the passenger compartment ceiling, thus increasing the space they occupy inside the vehicle.

In other known arrangements the sliding panel retracts into an opening between fixed upper exterior and lower interior surfaces of the roof structure.

With both of the arrangements described above—those in which the panel retracts beneath the interior surface of the roof structure and those which retract into a space between fixed upper and lower surfaces of the roof structure—the retractable panel is often recessed relative to the remaining roof surface, even in its closed position, or it must jog downwardly at the initiation of its retraction step in order to clear the fixed roof structure. Recessing of the sliding panel causes undesirable aerodynamic effects and can present sealing problems inasmuch as moisture may be driven directly into the seal area as the vehicle travels. On the other hand, a discontinuity in the path of travel can complicate the tracks or other mechanism for guiding the sliding panel and/or increase the actuation forces required.

Further, such systems often can only be mounted, dismounted and/or adjusted from inside the passenger compartment, which is often inconvenient.

SUMMARY OF THE INVENTION

An object of the present invention is to provide a retractable closure in which the retractable panel is not only substantially flush with the upper surface of the structure with the retractable panel in the closed position but also avoids vertical jogs in its path of travel.

The invention has as a further object to provide, in conjunction with the features described above, a retractable closure in which neither the retractable panel nor the actuating mechanism is exposed within or requires servicing from the lower surface of the structure.

Yet another object is to provide, in conjunction with the features described in the above objects, a retractable closure which provides ready access from the upper surface of the structure to all elements of the retractable closure to facilitate servicing and adjustment while maintaining a smooth, streamlined appearance.

According to the present invention there is provided a recessed area in the upper surface adjacent to and somewhat larger than the aperture forming a stationary panel over which a liftable panel is mounted. The liftable and stationary panels define a space housing the actuating mechanisms and into which a translating panel to cover the aperture may be drawn.

As will be seen, this arrangement minimizes any lowering of the ceiling over the passenger compartment, thus leaving more space at the level of passengers' heads and, moreover, facilitates repair from the outside. This arrangement further obviates any dismounting of the inner ceiling liner and the attendant risk of damage thereto during servicing and repair of the sliding roof system.

In the preferred embodiment, the stationary panel is integral with the surrounding roof structure and recessed to substantially the same level as the remainder of the interior ceiling of the passenger compartment.

The reduction of thickness can be on the order of $\frac{2}{3}$ to $\frac{1}{3}$ over known arrangements, with overall thicknesses of as low as 23 to 25 mm being possible with the present invention.

A further considerable advantage of the disclosed arrangement is that the sliding panel which closes the opening is not subjected to vertical displacement, with its motion being entirely along a smooth, generally horizontal path. This feature leads itself to cable actuation of the sliding panel with the cable either being hand-actuated using a crank or automatically actuated using a motor which may be housed in the rear trunk of the vehicle.

In a preferred embodiment, the actuating mechanism for the liftable panel includes spring-actuated parallelogram-type linkages at each side of the liftable panel between this panel and the roof structure as well as an arrangement whereby the edge of the sliding panel adjacent the liftable panel pushes the liftable panel over at least a first portion of its lifting stroke from the lowered, closed position thereof.

Owing to this particular arrangement, there are obtained several important advantages. First, the overall mechanism is highly simplified, especially in the case of the embodiments discussed below, leading to an easier production and a lower cost. Further, since the first portion of the liftable panel movement is derived from the movement of the sliding panel itself, the forward edge of the liftable panel rests, in its lowered position, firmly against the rear edge of the sliding panel, so that the sealing is very effective. Finally, since the pushing action supplements the liftable panel linkages independently from the actuating mechanism of the sliding panel, the linkages can be of minimum bulk, including in the transverse direction, thus permitting a corresponding increase of the width of the cleared opening.

In a particularly advantageous embodiment, the linking members are removably secured either to the roof structure or to the liftable panel, preferably the latter. Thus, the liftable panel can be readily dismounted and remounted when it is in its raised position, which facilitates ready access to the linking means. This advantage is important since it avoids the need to dismount the liftable panel through the inside of the passenger compartment, as with some known embodiments. Such an operation can be complex and time-consuming, particularly when a fixed panel has to be removed along with a liner which typically covers the fixed panel.

It is likewise important to note that, owing to this top access to the actuating mechanisms by separation of the liftable panel, the initial production installation is greatly simplified. Moreover, it is possible to provide a sliding panel, and thus an opening to be cleared, either to the front or to the rear of the liftable panel (this being achievable in all instances regardless of which of several embodiments of the invention is chosen). In fact, the forming of the fixed portion of the structure, including a roof structure in the case of a car, may be made in a single operation using a single stamp tooling set. Similarly, whether the opening to be closed by the sliding panel is to be in front or behind the fixed portion, it may be cut with a single tooling set.

Other features and advantages of the invention will become clear upon reading the following description, given merely by way of example without any intent of limitation, in connection with the appended drawings.

Figure 1:
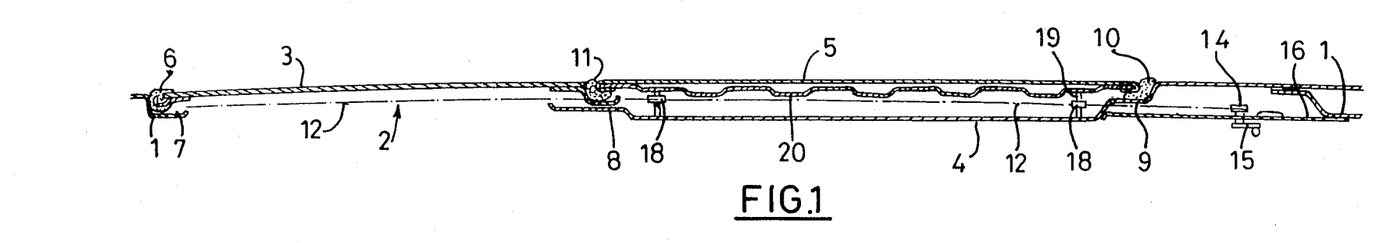
FIG. 1 is a longitudinal sectional view taken along line A—A of FIG. 3 and showing one embodiment of the retractable closure of the invention showing the sliding panel in the closed or extended position.
Figure 2:
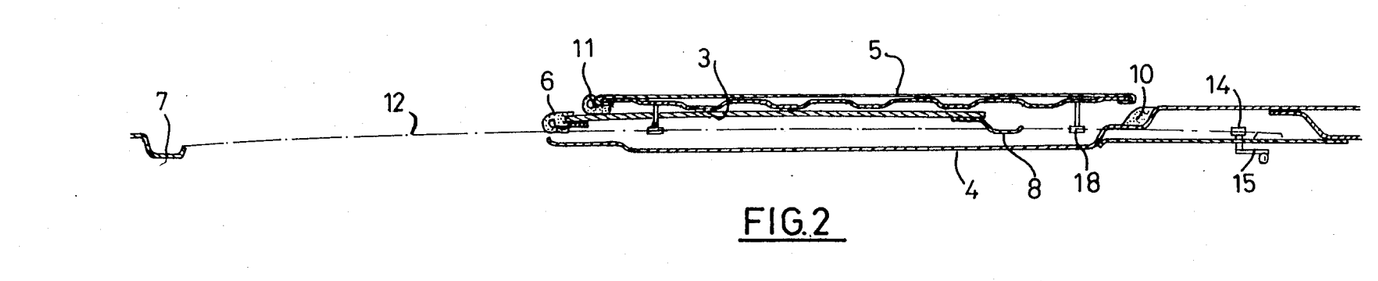
FIG. 2 is a view similar to FIG. 1, showing the sliding panel in the open or retracted position.

The retractable closure for an opening according to the invention is illustrated as a sliding roof apparatus for motor vehicles in the figures. In the FIG. 1-3 embodiment the apparatus is shown mounted in the structure 1, which may be, for example, the roof structure over the passenger compartment of a vehicle. The opening 2 is the uncoverable area. The sliding roof apparatus comprises essentially a first moveable panel 3 capable of sealing the opening 2 as shown in FIG. 1. As shown in FIG. 2, an actuating mechanism, described below, causes the panel 3 to translate from the FIG. 1 position sealing the opening to the FIG. 2 position above a recessed portion of the upper surface forming a stationary panel 4. As shown, the lower surface of the stationary panel 4 also serves as a portion of the ceiling. Further the sliding roof apparatus of the invention includes a liftable panel 5 located above the stationary panel 4 and liftable and lowerable with respect to the latter by means of an actuating mechanism also to be described, so as to define with panel 4 a space which contains the actuating mechanisms and which, with panel 5 in its raised position, receives the sliding panel 3 as it is retracted.

Panel 3 has along its front and lateral edges a resilient sealing member 6 which mates with a recessed transverse formed molding 7 formed in the roof structure 1 along the edges adjacent the sealing member 6 of panel 3. In addition, the lower rear edge of the panel 3 is equipped with a rearwardly-projecting transverse channel 8, having its concavity turned upwardly and slightly offset downwardly in relation to the body of panel 3 to collect and direct to a drain (not shown) any water which might leak in through a seal between the rear edge of the sliding panel 3 and a further sealing member 11 at the leading edge of the liftable panel 5.

Finally, along the lateral and rear edges of the stationary panel 4, at the transition between the panel and the upper roof surface, there is formed a shoulder 9 having a sealing member 10 housed therein to seal with the adjacent edges of the liftable panel 5 in the recess when in the position shown in FIG. 1. Hence, the sealing members 6, 10 and 11 cooperate to seal around the entire peripheries of panels 3 and 5 when the retractable closure is in the condition shown in FIG. 1.

Figure 3:
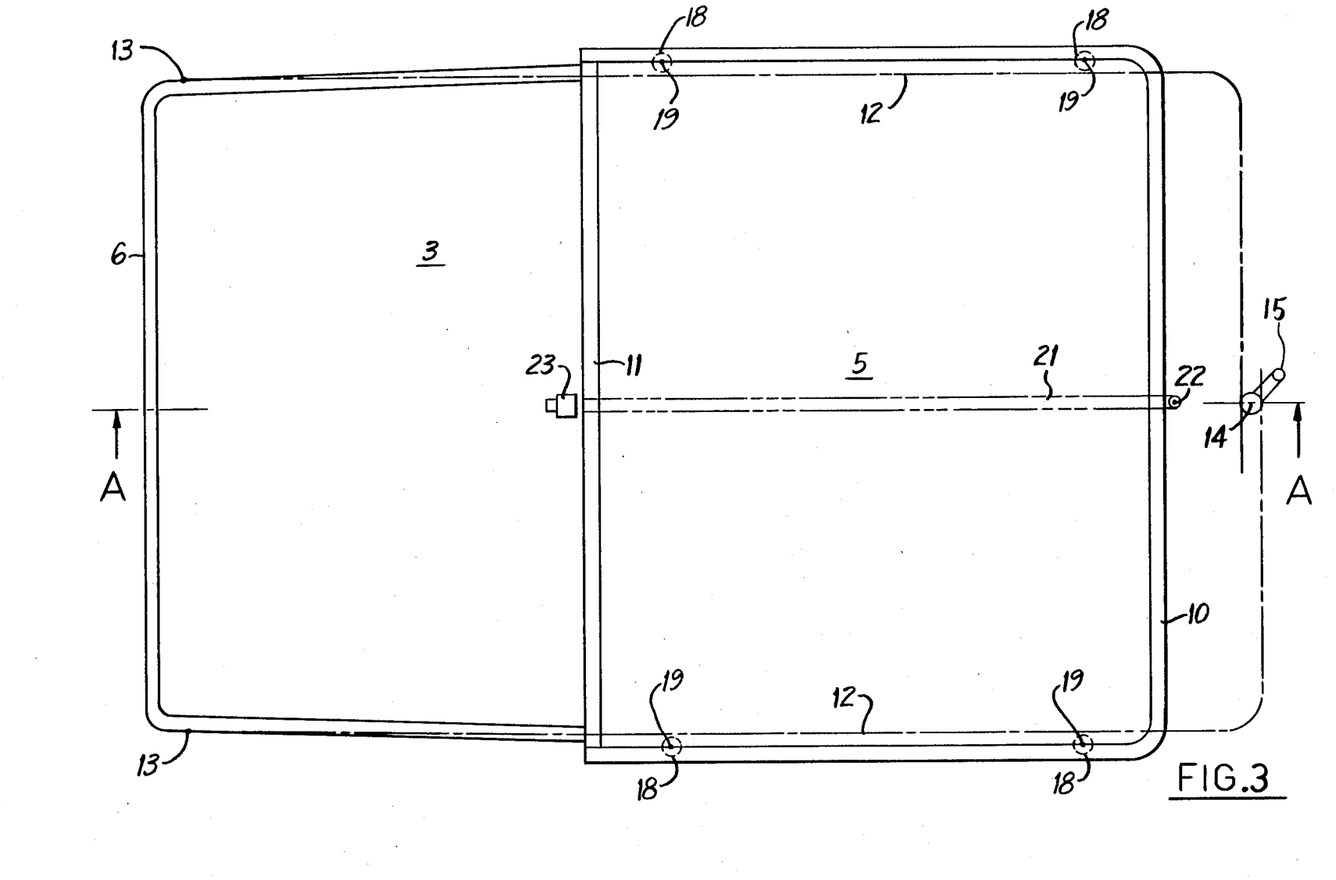
FIG. 3 is a plan view of the retractable closure shown in FIGS. 1 and 2.

As may be seen in FIG. 3, the sliding panel 3 has a slightly trapezoidal shape narrowing in the direction opposite the liftable panel 5. With this arrangement the sealing member 6 engages the channel 7 only during the final stages of the movement of the panel 3 into the closed position shown in FIG. 1. The liftable panel 5 is shown to be of essentially rectangular shape and has such a size that panel 3 can be almost entirely drawn-in into the space defined by panel 5 and the stationary panel 4 in the roof structure of the car, as shown in FIG. 2.

There will be now described the actuating mechanisms of stationary panel 4. In the illustrated embodiment of FIGS. 1-3, these mechanisms are united in a single driving device common to both panels. This device comprises two cables 12 fastened to the sliding panel 3 at points 13 by means of any suitable conventional member (not shown in detail) and are connected, by winding therearound, to a pin 14 of a suitable operating member 15, such as hand lever, a handle or a crank arm, mounted and partially housed in an inner wall 16 of the passenger compartment, linked with the panel 4 of the roof structure. Cable guides (not shown) confine the travel of the cables 12 to the paths shown. A portion of each cable 12 has a sheath (not shown) acting as a toothed rack meshing with two rotatable, toothed, drive members 18 threaded on rods 19 depending from the lower surface 20 of the liftable panel 5.

The cable-actuating mechanism of panels 3 and 5 shown and described allows for the simultaneous displacement of said panels between the closed position (FIG. 1), in which the sliding panel 3 and the liftable panel 5 are both substantially flush with the surface of the roof structure 1 of the car surrounding panels 3 and 5, and the opened position in which panel 5 is raised and panel 3 is retracted into the space between panels 4 and 5 (FIG. 2).

To clear the opening 2, the handle or crank 15 is turned, causing a winding of cables 12 about the pin 14 (or a pulley integral therewith). The cables 12 pull by translation the sliding panel 3 in the direction of pin 14 and simultaneously the cable sheaths, in mesh with the drive members 18, rotate the latter to cause a rising motion of the rods 19 and, thus, of panel 5. The raising of panel 5 thus frees a supplementary vertical space with respect to the fixed panel 4, enabling panel 3 to be drawn into the space between the liftable panel 5 and the lower panel 4.

The closing of this slidable roof is effected by actuation of the device in the opposite direction with the cable guides confining the cables to their desired paths.

According to an alternative embodiment (not shown), the cable operating member could be a motor and gear-reducer combination housed within the body panels or in the trunk of the motor vehicle. Alternative mechanisms for raising the liftable panel might also be used, as in the alternative embodiments discussed below which employ separate respective mechanisms for the sliding panel 3, on the one hand, and the liftable panel 5, on the other hand. In addition to the systems discussed below it would thus be possible to use a system of cables 12 and toothed, threaded members 18 on rods 19 with a handle 15 solely to actuate the liftable panel 5, with a separate actuating system for the sliding panel 3, as shown in phantom in FIG. 3. That separate actuating system comprises a threaded rod 21 linked by suitable gearing to another crank 22 similar to the handle 15 and meshing with an internally-threaded block 23 fixed to the sliding panel 3. With such an arrangement the crank 15 is first operated, thus raising the panel 5, after which the handle 22 is actuated to retract the sliding panel 3, the relative positions of these panels in the closed and open positions being the same as shown in FIGS. 1 and 2, respectively.

The movable panel 3 may be constructed of sheet-metal, glass or a translucent material having 2 to 3 mm thickness, such as a polycarbonate or a composite material of the molded fiberglass type. The liftable panel 5 and the stationary panel 4 may be made of sheet-metal or a composite material of the type suggested for use in panel 3. Composite materials provide a weight reduction and resist corrosion under adverse weathering conditions, as are typically encountered with motor vehicles. Moreover, panels made of composite materials may be fabricated in different colors to coordinate with the color scheme of the motor vehicle.

It will be appreciated that, in addition to the above-mentioned advantages, the present invention permits a reduction, relative to known systems, of the number of parts used, thus simplifying manufacture and rendering the system susceptible to assembly line production.

Figure 4:
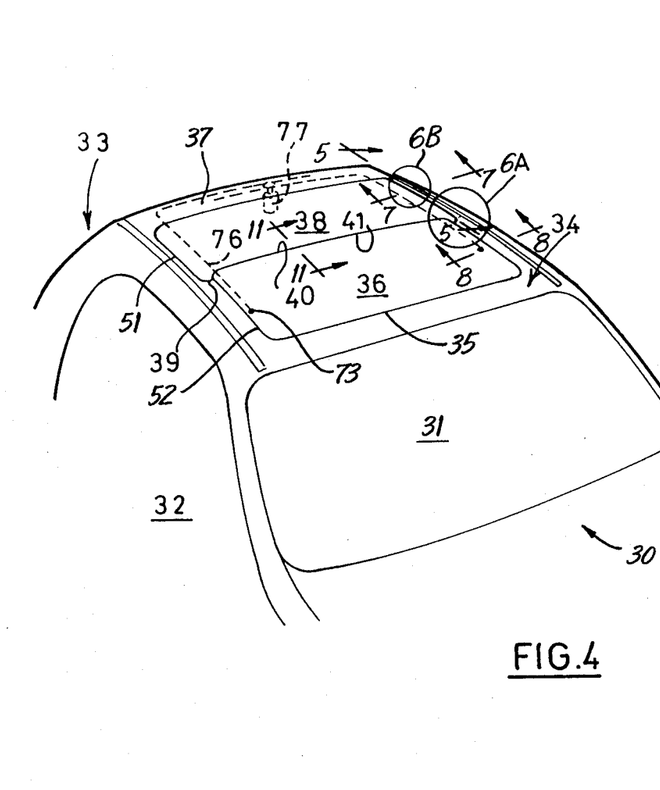
FIG. 4 is a perspective view, of the roof structure of a car provided with a second embodiment of a sliding roof apparatus in accordance with the invention.

A second embodiment of a retractable closure according to the invention and incorporated into a motor vehicle roof above the passenger compartment is shown in FIGS. 4-11. The upper portion of the vehicle 30 shown is of conventional design, including a windshield 31, doors 32, a rear-window 33, and a roof structure 34. The roof structure 34 is shown to have the usual generally horizontal but slightly bulging shape. According to the invention there is provided a substantially rectangular, though slightly trapezoidal (not discernable in FIG. 4 but see FIG. 3 and the comments above regarding the sealing member 6), opening 35 having radiused corners and closeable with a sliding roof panel 36. To the rear of opening 35 there is provided in the upper surface of the roof structure 34 a recessed area 37 also having a generally rectangular shape with radiused corners and extending substantially to the rear of the roof structure. In this rear recessed area 37 is housed a liftable panel 38 which, in the closed position shown in FIG. 4, is, along with panel 36, generally flush with the upper surface of the roof structure. The recessed area 37 and the panel 38 are somewhat wider than the opening 35 and the panel 36, with the front edge 41 of panel 38 being contoured to mate with the rear edge 40 of panel 36 such that the front corners 39 of the panel 38 extend slightly forward of the rear edge 40 of panel 36. See also FIG. 6A representing a top view of the area 6A of FIG. 4.

Figure 5A:
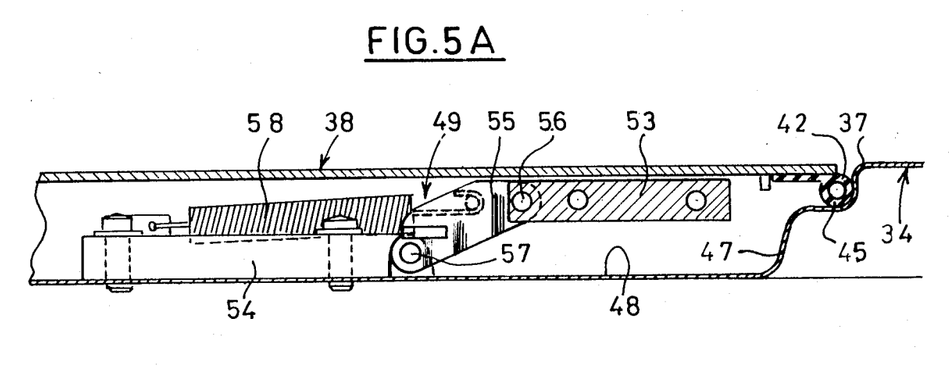
FIGS. 5A and 5B, considered jointly, are a sectional view taken along line 5—5 in FIG. 4, the liftable panel 38 being in its lowered position.
Figure 5B:
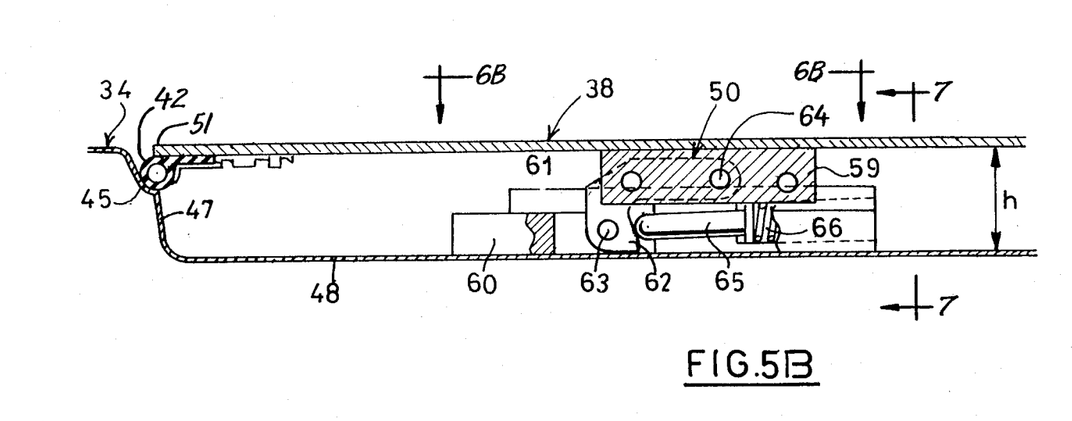
Figure 6A:
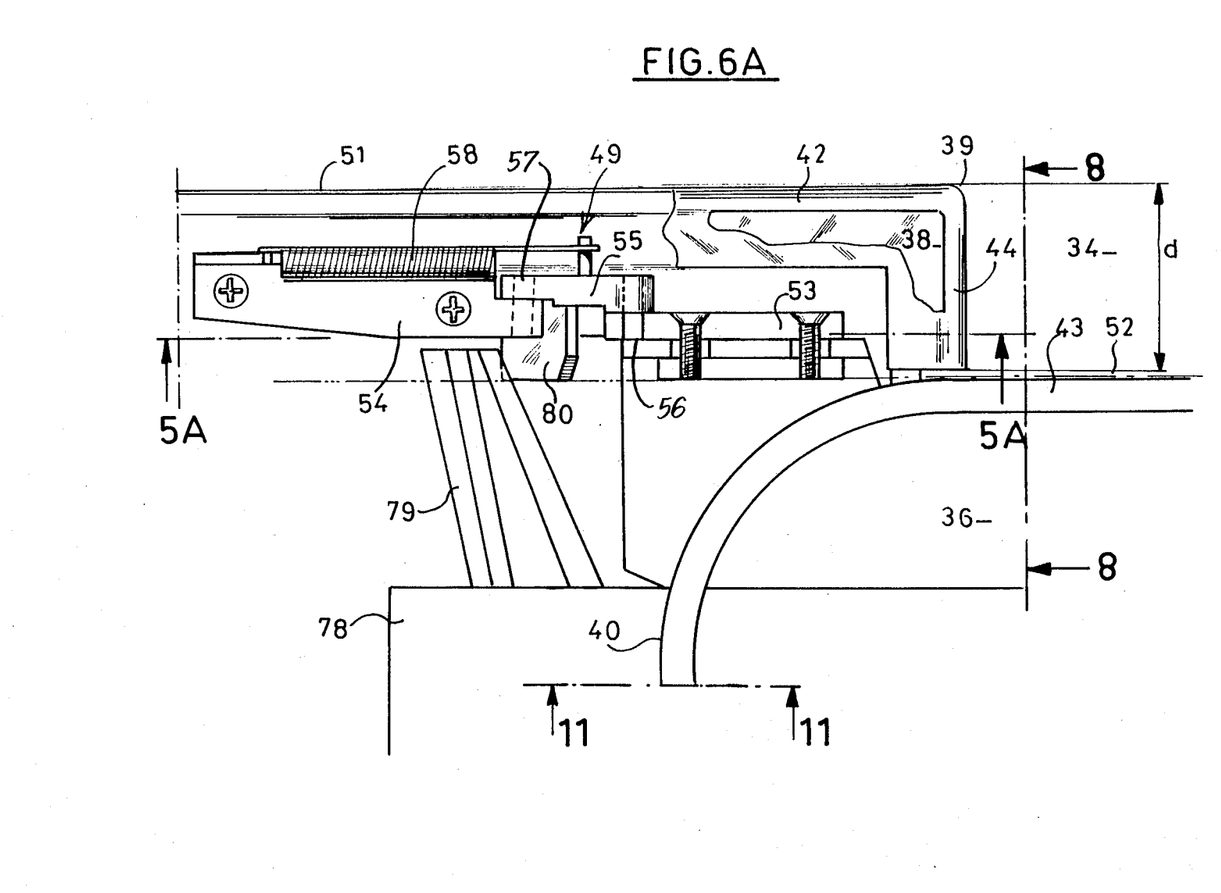
FIGS. 6A and 6B are top views of the areas 6A and 6B, respectively, of FIG. 4, the liftable panel 38 being broken away in FIG. 6A and completely removed in FIG. 6B to show the lifting mechanism.

FIGS. 5A and 5B, considered together, comprise a section taken along line 5—5 of FIG. 4 and illustrate that the panel 38 has, along the rear and lateral edges 51 thereof, a sealing gasket 42. As illustrated in FIG. 6A, the gasket 42 of the panel 38 is interrupted at the location where edges 44 of front corners 39 of panel 38 are perpendicularly abut a similar gasket 43 around the entire periphery of panel 36.

With panel 38 in the lowered position shown in FIGS. 5A and 5B, the gasket 42 comes to bear in a shoulder 45 formed in the roof structure 34 around the adjacent periphery of the recess 37 to the points where gasket 42 is interrupted to accommodate the rear edge 40 of panel 36, as described above. From these points the shoulder 45 continues along the lateral and forward edges of the opening 35, cooperating with the gasket 43 of the panel 36 with the latter in the closed position. As shown in FIGS. 5A and 5B, in the area of the recess 37 the ceiling structure 34 extends generally vertically downwardly beyond the shoulder 45 to form an edge 47 and then generally horizontally to form a stationary panel 48. This panel 48 is located beneath the panel 38 by a distance h, representing the closed height of the sliding-roof assembly according to the invention. The lower surface of this panel 48 forms to the interior surface of a car roof even though, in this case, it is integrally formed with the upper surface of the roof structure, these surfaces shown being formed from a single stamped sheet. Along the rear edge of the opening 35 the panel 48 is only connected with roof structure 34 at the lateral edge 47 at the corners 39 of panel 38, at which points the edge 47 turns, along with the shoulder 45, to follow the periphery of the opening 35. It will be appreciated that the absence of any edge comparable to edge 47 across the rear of opening 35 permits the panel 36 to slide between panel 48 and panel 38.

As illustrated in FIGS. 5A, 5B, 6A, 6B and 7, the liftable panel 38 is linked to the bottom panel 48, via lifting members including a pair of front linkages 49 and a pair of rear linkages 50, one of each pair being located generally along the longitudinal edges 51 of liftable panel 38. It will be appreciated that the transverse width of the linkages 49 and 50 must be confined to the distance d separating longitudinal edges 51 and 52 of the two panels 38 and 36, respectively. Hence, in order to maximize the width of the opening 35 closeable by the panel 36, the transverse width of the linkages 49 and 50 should be kept to a minimum.

The linkages 49 and 50 located on the right side (as viewed in FIG. 4) of the panel 48 will be described, it being understood that those at the left side are symmetrical. The forward linkage 49 includes two securement blocks 53 and 54, the former secured to the lower surface of panel 38 and the latter secured to the upper surface of panel 48. A lever 55 is articulated at between the blocks 53 and 54 at transverse horizontal axes 56 and 57, respectively. Thus, the lever 55 is pivotally connected for movement in a vertical longitudinal plane. In the closed position of panel 38 shown in FIG. 5A, the lever 55 is upwardly and forwardly inclined. A coil spring 58 is secured under tension between an intermediate position on the lever 55 and a point at the rear of the support 54, the spring 58 thus being itself directed in a vertical longitudinal plane with a slight forward inclination relative to the horizontal. As shown in FIG. 6A, the entire linkage 49, including the block 53 secured to the lower surface of panel 38, is within the width d provided for the linkage.

Figure 6B:
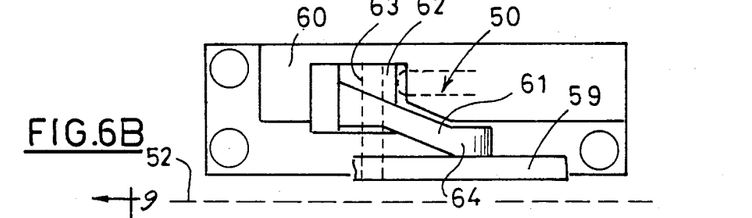
Figure 7:
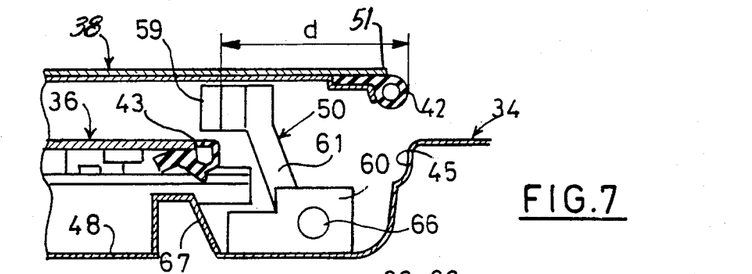
FIG. 7 is a partial sectional view taken along line 7—7 of FIG. 4, the liftable panel 38 being in its raised position with the sliding panel 36 in its retracted, open position.

As shown in FIGS. 5B, 6B and 7, each rear linkage 50 also includes, as was the case with the linkages 49, two securement blocks 59 and 60 respectively mounted to the lower surface of panel 38 and the upper surface of panel 48, with a lever 61 articulated to the blocks at axes 64 and 63 respectively. In contrast to the linear shape of the levers 55, levers 61 are L-shaped, with one leg extending generally parallel to and the other leg extending perpendicularly downward from the panel 38 with the panel in the closed position as shown in FIG. 5B. A downwardly-directed heel 62 beneath the pivot axis 63 has bearing on the forward surface thereof a rearwardly-directed, substantially horizontal, finger 65 urged against the heel through the action of a compression spring 66 housed in the forward portion of the lower block 60. As will be further appreciated from the discussion which follows, this arrangement tends to urge the lever 61 clockwise (as shown in FIG. 5B), in turn tending to keep the panel 38 in its lowered position until the corner of the heel passes above the rod 65 (see FIG. 10B). As shown in FIGS. 6B and 7, lever 61 has a slight lateral offset, so as to avoid the securement block 59 with panel 38 in the closed position. Inasmuch as the pivot points, 56, 57, 63 and 64 form a parallelogram, the panel 38 remains generally parallel to the panel 48 throughout its range of travel.

The securement blocks 53 and 59 may be made readily mountable and demountable from the panel 38 with that panel in the raised position (as with the machine screws illustrated in FIG. 6A) to facilitate assembly and any necessary service and repair.

Figures 8, 9:
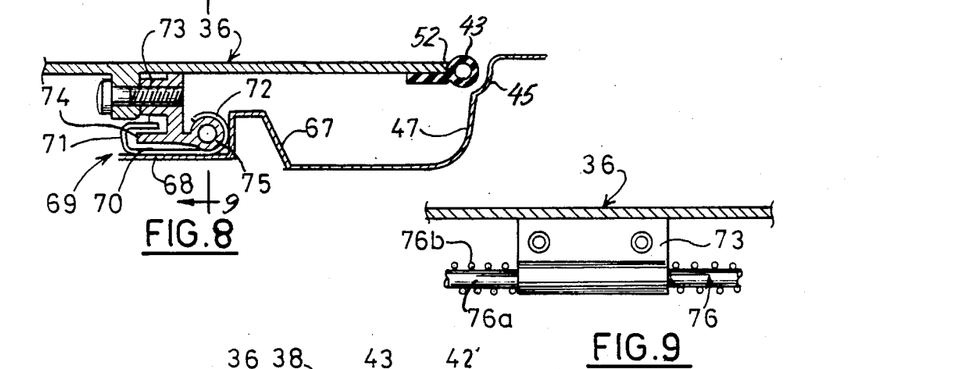
FIG. 8 is a partial sectional view taken along line 8—8 of FIG. 4, the sliding panel 36 being in its retracted, open position.
FIG. 9 is a side elevation of a typical point of attachment of a cable 76 to the panel 36 as viewed from line 9—9 of FIG. 8.
Figures 10A, 10B:
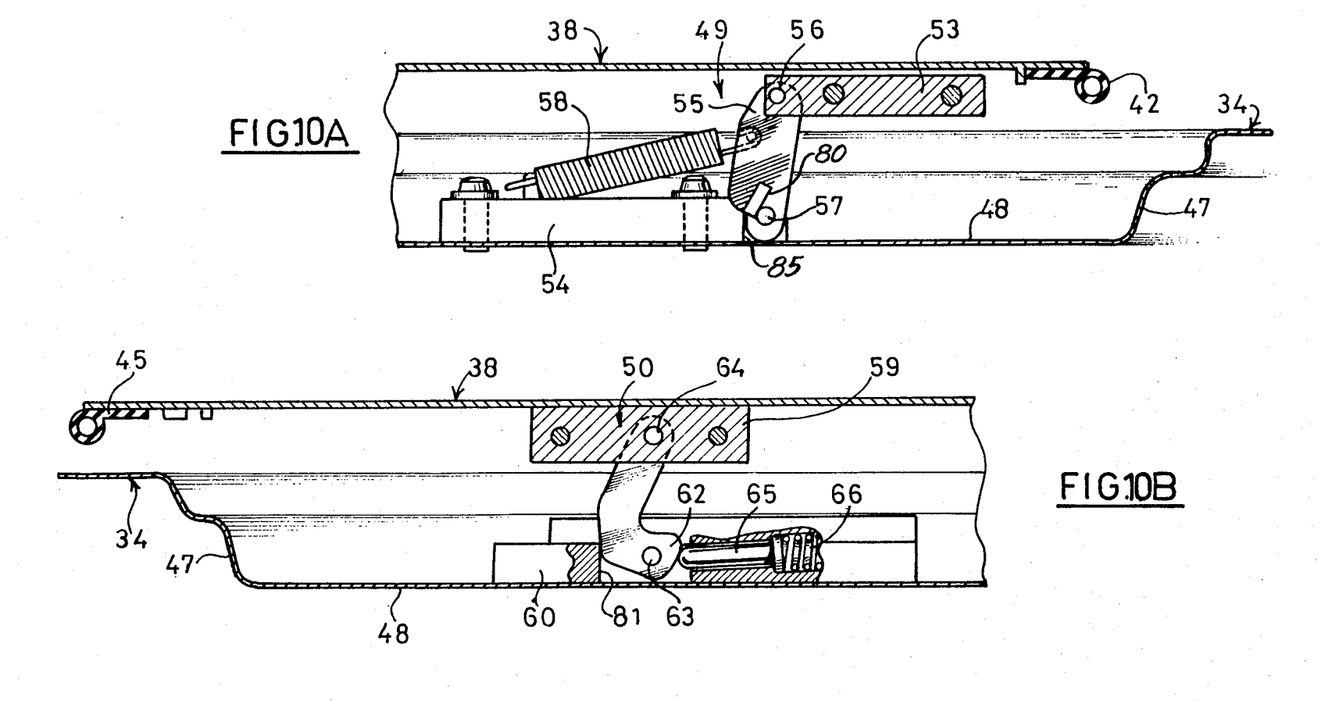
FIGS. 10A and 10B are views respectively corresponding to FIGS. 5A and 5B, showing the liftable panel 38 in the raised position.

As shown in FIGS. 7 and 8, the lower panel 48 has, at a distance which is of the same order of magnitude as the aforesaid width distance d of the actuation linkages 49 and 50 (FIG. 6A), a formed ridge 67 which is upwardly-directed and has for one of its objects to cooperate with the lateral edge 47 in confining water which may have infiltrated through the seals around the peripheries of the openings 35 and 37. As with the shoulder 45 and the lateral edge 47, this ridge 67 extends along the lateral and forward edges of the opening 35, into which panel 36 slides, as well as along the lateral and rear edges of opening 37 housing the liftable panel 38. As shown in FIGS. 7 and 8, it is between the ridge 67 and the vertical edge 47 that the front and rear linkages 49 and 50 are located.

As shown in FIG. 8, the sliding panel 36 extends transversely above and beyond ridge 67 such that, owing to the slightly trapezoidal shape of the panel 36, its sealing gasket 43 along its leading and longitudinal edges 52 comes to bear against mating contour 45 around the periphery of the opening 35 as the panel 36 is translated into its closed position.

It will be noted that, in the area coverable by the sliding panel 36, the aperture begins at the edge 69 of the generally horizontal lip 68 extending a limited distance inboard of the formed ridge 67. The lip 68 inboard of the ridge 67 carries a guide 70 which extends along the front and longitudinal edges of opening 35, rearwardly across the panel 48 underneath the panel 38, with the ends being directed toward each other along the rear edge of the recess 37. As viewed in cross-section in FIG. 8, the guide 70 comprises a C-shaped channel portion 71 facing a substantially circular guiding portion 72. Guiding and driving blocks 73 are secured to the lower surface of the sliding panel 36 at locations above and aligned with the longitudinally-extending segments of the shaped member 70. Guiding skids 74 travel in the channel portion 71 of the shaped member 70, with portions 75 in which driving cables 76 are clamped free to reciprocate in the longitudinally-extending segments of the circular guiding portion 72 of the shaped member.

Cables 76 are of the type having a continuous web 76a and a helical external sheath 76b of substantially the same outside diameter of the portions 75, such that the cables 76 are confined and guided along their paths by the guiding portion 72 of the member 70. As depicted by way of dotted lines in FIG. 4, cables 76 extend rearwardly from the blocks 73 to the rear of opening 37, where they are directed inwardly along the rear edge of the latter opening, coming into juxtaposition, one next to the other, in the middle of this rear edge, at a motor 77. Alternatively, the motor might be located in, and the cables 76 extend into, the trunk or other area of the vehicle. The sliding panel 36 is accordingly guided through a generally horizontal, reciprocating, motion defined by the longitudinal segments of the member 70, without any vertical discontinuity over the course of its stroke.

Figure 11:
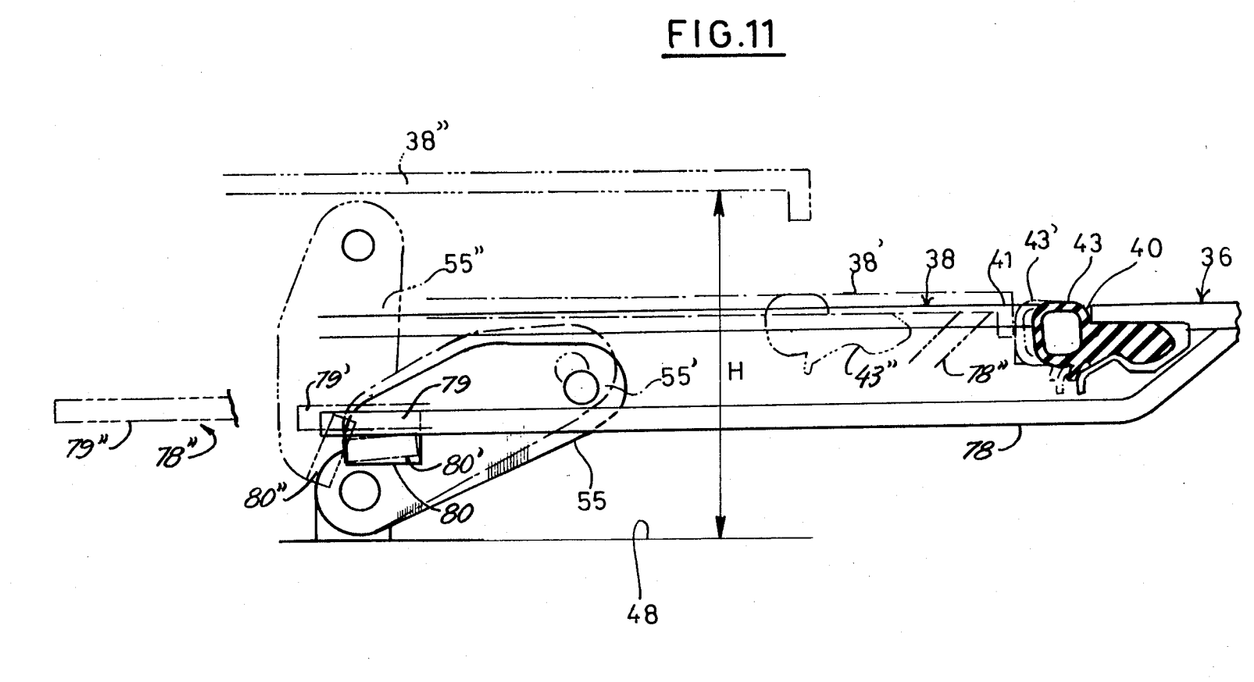
FIG. 11 is an enlarged partial sectional view taken along line 11—11 of FIG. 4 showing the contact of the sliding panel 36 with the liftable panel 38 and the motion of the lifting lever 55.

The preferred embodiment of the invention includes a provision whereby the retraction of the panel 36 assists in the initial lifting of the panel 38. This assistance is provided through the action of the rear edge 40 of the panel 36 on the leading edge 41 of the liftable panel 38 at the initiation of the retraction of the panel 36. As shown in FIG. 11, as panel 36 begins to retract, the lifting panel 38 is pushed rearwardly, the rear edge 40 (provided with its sealing joint 43) of the sliding panel 36 bearing on the forward edge 41 of panel 38. As indicated in FIG. 11, the forward edge 41 should have a vertical height sufficient for the interaction between the panels 36 and 38 to continue over that portion of the travel of the panel 38 in which it rises from the closed position to the slightly higher position in which it is depicted as 38'. The edge 41 of panel 38 may be slightly inclined downwards and rearwards of panel 36 so as to not only promote the pushing movement by the panel 36, but also to improve the sealing.

During the first portion of the travel of panel 38 levers 55 are slightly displaced into the position in which they are depicted as 55', a position which can be made to coincide with the point at which the tension of the springs 58 acting on the levers 55 is able to overcome the counteracting forces on the levers as a result of the weight of panel 38, which have a tendency to keep the panel 38 in its lower, closed position. The interaction of the heel 62 of the lever 61 with the spring-loaded rod 65, discussed above, may also be established such as to reduce closing action at about the same point.

As an alternative or in addition to relying on the rear edge 40 of the panel 36 to act on the forward edge 41 of the panel 38 to assist during the initial lifting action of the latter, the panels may be provided with cooperating cam-and-follower-like surfaces which force the liftable panel upward as the sliding panel begins its rearward movement. While not specifically illustrated, this arrangement might take the form, e.g., of ramp-like surfaces extending rearwardly from the panel 36 underneath the panel 38.

Once the levers 55 pass their position shown at 55', the lifting motion of panel 38 is continued by the action of springs 58 until reaching a maximum lifting position 38" which corresponds to a practically vertical position 55" of the levers, at which point these levers come to bear on stroke-limit abutments 85, with levers 61 bearing on similar abutments 81 provided on the blocks 60 of the rear linkages 50. The tension in the springs 58 then maintain the liftable panel 38 in the lifted position 38". With the panel 38 in its fully raised position 38", there is then provided space having a height H between the lower panel 48 and panel 38. The sliding panel 36 can thus continue its rearward travel into the space H beneath the liftable panel 38 until completely drawn in beneath the latter. The motion of panel 36, including both the first part of the stroke which causes the pushing of panel 38 and the remainder of its retraction, is effected by the action of cables 76 driven by the motor 77, which may be controlled, e.g., from the dashboard.

The tension in the springs 58 should be sufficient, or other means should be provided, to prevent excessive movement and vibration of the panel 38 while in the raised position which might otherwise result in objectionable noise and/or damage to the panel 36 while in its retracted position.

When the motor 77 is actuated in the reverse direction, cables 76 push the sliding panel 36 forward into its position closing the opening 35. As shown in FIGS. 6A and 11, a member 78 extends rearwardly beyond the rear edge 40 of panel 36 and carries two transverse fingers 79. The outboard ends of these fingers 79 cooperate with inwardly directed projections 80 secured to the levers 55. In the last portion of the travel of panel 36 lateral fingers 79 act as cams against the tabs 80 integral with levers 55, forcing the latter forward into the position shown in FIG. 5A, and, consequently, causing the lowering of the liftable panel 38. This cam action utilizes a portion of the force driving the panel 36 to force the leading edge 41 of panel 38 into sealing contact with the rear edge 40 of panel 36. It will be appreciated that the independence of the spring-actuated linkage actuation system for the lifting panel 38 from the cable actuation system of the sliding panel 38 (except for the cooperation during the initial stages of opening and the final stages of closing as discussed in connection with FIG. 11, above) permits the sliding panel to be selectively actuated to either its fully open position or any midrange position.

Figure 12:
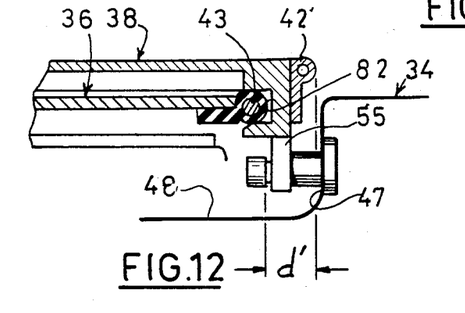
FIGS. 12 and 13 illustrate alternative embodiments of the invention.

An alternative arrangement for the linkage between the roof structure 34 and the liftable panel 38 is shown in FIG. 12. In FIG. 12 the liftable panel 38 has along its longitudinal edges lower slides 82 located, with panel 38 in its raised position, at the level of sliding panel 36, such that when panel 38 is in its raised position (shown as 38" in FIG. 11), these slides are positioned to receive panel 36. The panel 36 may continue to be drawn rearwardly with its lateral sealing gaskets 43 being guided by the slides 82. Thus, the guiding skids 74 and the profiled sections 71 of the member 70 provided in the previous embodiment (FIG. 8) may be omitted. Moreover, as also shown in FIG. 12, the levers of at least the actuating forward linkage 49 may, if desired, be articulated on the lateral edge 47 as opposed to on the surface of the lower panel 48. The use of the slides 82 in conjunction with this alternative mounting system for the levers 55 allows a significant reduction in the required distance d between the edge 51 of the panel 38 and the edge 52 of the panel 36, thus increasing the width of available opening.

Figure 13:
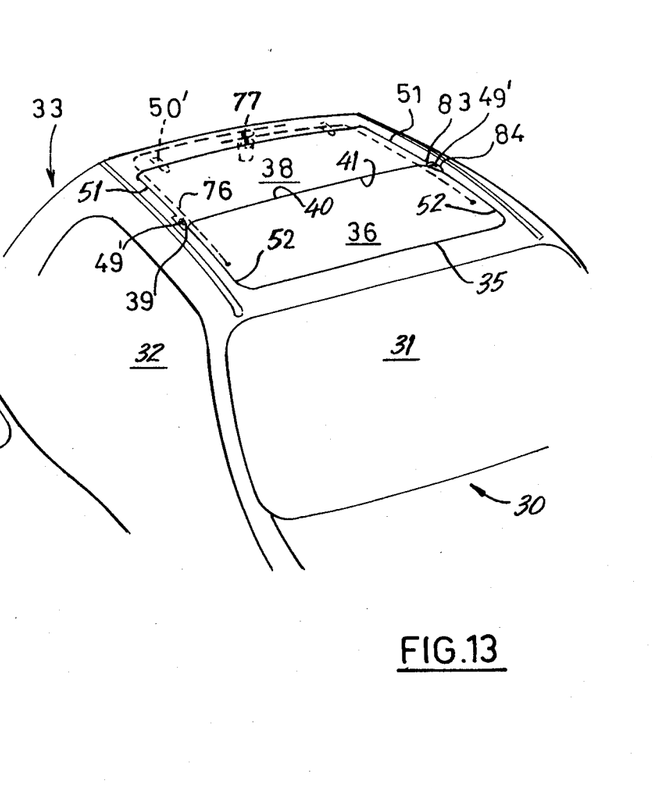

Another embodiment is shown in FIG. 13, wherein the lateral edges 51, of the liftable panel 38 jog laterally outward at 83 to form tabs 84 at the front corners 39 to which the front lifting linkages 49' are attached. By attaching the rear lifting linkages 50' along the rear edge of the panel 38, as opposed to along its lateral edges 51 as in the previous embodiment FIGS. 4-11 embodiment, the portions of the lateral edges 51 behind the tabs 84 may be substantially aligned with the lateral edges 52 of the panel 36.

It is to be understood that the foregoing description has been given merely by way of explanation, without any intent to limit the scope of the invention as defined in the appended claims.

I claim as my invention:

1. A retractable closure for an aperture in a generally planar structure having upper and lower surfaces and a relatively thin cross-section comprising:

an area adjacent to and somewhat larger than the aperture in which the upper surface of the structure is recessed to form a first stationary panel;

a second panel mounted for translation between a first, closed position substantially flush with the upper surface of the structure and covering said aperture and a second, open position over the first panel in the recessed area adjacent said aperture;

a third panel mounted above the first panel for movement having a component normal to the upper surface of the structure, the third panel being mounted for movement between a first, lowered position substantially flush with the upper surface of the structure and covering the recessed area and a second, raised position in which it creates a vertical space between its lower surface and the stationary panel into which vertical space the second panel translates in moving into its second, open position, the path of movement of the third panel between its first and second positions being defined by lifting members connected between the third panel and the upper surface of the structure within the area of the recess; and means for actuating the second and third panels to effect movement between their respective first and second positions, the third panel being actuated during at least the initial stages of movement from its first position to its second position by the initial translational movement of the second panel from its first position toward its second position, the third panel being actuated during the remainder of its movement from its first position to its second position by separate actuating means associated with the lifting members.

2. The retractable closure of claim 1 wherein the lifting members may be disconnected from the upper surface of the structure.

3. The retractable closure of claim 1 wherein the lifting members comprise a pair of parallelogram-type linkages, the linkages being positioned near opposite edges of the third panel such that the second panel passes between the linkages as it moves into its second position.

4. The retractable closure of claim 1 wherein the edge of the second panel adjacent the third panel at least initially pushes against the adjacent edge of the third panel as the second panel translates from its position toward its second position thereby initiating the movement of the third panel from its first position toward its second position.

5. The retractable closure of claim 1, the corners of the third panel adjacent the second panel with both of said panels in their first positions carrying cam surfaces, the second panel carrying cam members to cooperate with the cam surfaces on the third panel as the second panel translates from its first position toward its second position to at least initiate the movement of the third panel from its first position toward its second position.

6. The retractable closure of claim 1 wherein the means for actuating the third panel into its second position comprise means for urging the third panel toward its first position during the first portion of the stroke and toward its second position during the second portion of the stroke.

7. The retractable closure of claim 1, the actuation of the third panel by the first panel being limited to the initial stages of the movement of the third panel from its first position to the second, complementary actuating means effecting the remainder of the movement of the third panel into its second position.

8. The retractable closure of claim 3, the means for actuating the third panel comprising means for exerting a force on the parallelogram-type linkages tending to raise the third panel from its first position to its second position.

9. The retractable closure of claim 8 wherein the means for exerting the force on the parallelogram linkages comprises tension springs mounted between two adjacent legs of the parallelogram.

10. The retractable closure of claim 9 wherein at least one fixed abutment is provided with each parallelogram linkage to limit the stroke of the linkage.

11. A sliding roof apparatus for a motor vehicle of the type which selectively opens and closes an aperture in the roof structure comprising:
   an area adjacent to and somewhat larger than the aperture in which the upper surface of the structure is recessed to form a first stationary panel;
   a second panel mounted for translation between a first, closed position substantially flush with the upper surface of the structure and sealingly covering said aperture and a second, open position over the first panel in the recessed area adjacent said aperture;
   a third panel mounted above the first panel for movement having a component normal to the upper surface of the structure, the third panel being mounted for movement between a first, lowered position substantially flush with the upper surface of the structure and sealingly covering the recessed area and a second, raised position in which it creates a vertical space between its lower surface and the stationary panel into which vertical space the second panel translates in moving into its second, open position, the path of movement of the third panel between its first and second positions being defined by lifting members connected between the third panel and the upper surface of the structure within the area of the recess; and
   means for actuating the second and third panels to effect movement between their respective first and second positions, the third panel being actuated during at least the initial stages of movement from its first position to the second by the initial translational movement of the second panel from its first position toward its second position, the third panel being actuated during the remainder of its movement from its first position to its second position by separate actuating means associated with the lifting members.

12. The sliding roof apparatus of claim 11 wherein the lifting members comprise a pair of parallelogram-type linkages, the linkages being positioned near opposite edges of the third panel such that the second panel passes between the linkages as it moves into its second position.

* * * * *